(12) United States Patent
Shinkuma et al.

(10) Patent No.: US 10,489,429 B2
(45) Date of Patent: Nov. 26, 2019

(54) RELATIONSHIP GRAPH EVALUATION SYSTEM

(71) Applicants: Kyoto University, Kyoto (JP); Kobe Digital Labo Inc., Hyogo (JP)

(72) Inventors: Ryoichi Shinkuma, Kyoto (JP); Kazuhiro Yamaguchi, Hyogo (JP)

(73) Assignees: Kyoto University, Kyoto (JP); Kobe Digital Labo Inc., Hyogo (JP)

( * ) Notice: Subject to any disclaimer, the term of this patent is extended or adjusted under 35 U.S.C. 154(b) by 626 days.

(21) Appl. No.: 15/119,809

(22) PCT Filed: Feb. 17, 2015

(86) PCT No.: PCT/JP2015/054210
§ 371 (c)(1),
(2) Date: Aug. 18, 2016

(87) PCT Pub. No.: WO2015/125758
PCT Pub. Date: Aug. 27, 2015

(65) Prior Publication Data
US 2017/0060989 A1    Mar. 2, 2017

(30) Foreign Application Priority Data
Feb. 19, 2014   (JP) .................................. 2014-029713

(51) Int. Cl.
*G06F 17/30*   (2006.01)
*G06F 16/28*   (2019.01)
(Continued)

(52) U.S. Cl.
CPC ............ *G06F 16/288* (2019.01); *G06F 16/28* (2019.01); *G06F 16/9024* (2019.01);
(Continued)

(58) Field of Classification Search
CPC . H04L 41/145; G06F 16/258; G06F 16/3323; G06F 16/3328; G06F 16/335; G06F 16/9024; G06F 17/2235
(Continued)

(56) References Cited

U.S. PATENT DOCUMENTS

| 7,031,895 B1 | 4/2006 | Takahashi et al. |
| 9,647,930 B2 * | 5/2017 | Axnas .................... H04W 40/02 |

(Continued)

FOREIGN PATENT DOCUMENTS

| JP | 4-113464 A | 4/1992 |
| JP | 2001-44993 A | 2/2001 |
| JP | 2010-140296 A | 6/2010 |

OTHER PUBLICATIONS

International Search Report dated Mar. 31, 2015 issued in corresponding PCT/JP2015/054210 application (1 page).
(Continued)

*Primary Examiner* — Dangelino N Gortayo
(74) *Attorney, Agent, or Firm* — Millen, White, Zelano & Branigan, P.C.; William Nixon

(57) ABSTRACT

The invention aims to provide a relationship evaluation system capable of effectively evaluating a relationship of a node to a reference node in a relationship graph in which plural nodes are connected by links. A reference point node is selected based on selection information regarding the reference point node input from the selection information input unit. Based on the reference point node, a relationship graph becoming an evaluation target is extracted from the relationship graph database to create a virtual communication network based on the graph. In the virtual communication network, simulation is executed by sequentially propagating a virtual communication packet to adjacent nodes from a reference point node selected by the reference point node selection unit as propagation origin. The rela-
(Continued)

tionship of the node to the reference node is evaluated based on the content of the communication packet received at the node as a result of executing the simulation.

19 Claims, 18 Drawing Sheets

(51) Int. Cl.
| | |
|---|---|
| *G06F 16/951* | (2019.01) |
| *G06F 16/901* | (2019.01) |
| *H04L 12/751* | (2013.01) |
| *H04L 12/733* | (2013.01) |
| *G06F 16/25* | (2019.01) |
| *G06F 16/335* | (2019.01) |
| *G06F 16/332* | (2019.01) |

(52) U.S. Cl.
CPC ............ *G06F 16/951* (2019.01); *H04L 45/02* (2013.01); *H04L 45/20* (2013.01); *G06F 16/258* (2019.01); *G06F 16/335* (2019.01); *G06F 16/3323* (2019.01); *G06F 16/3328* (2019.01)

(58) Field of Classification Search
USPC .................................. 707/778, 784; 709/223
See application file for complete search history.

(56) References Cited

U.S. PATENT DOCUMENTS

| | | | | |
|---|---|---|---|---|
| 2006/0106847 | A1* | 5/2006 | Eckardt, III | G06F 16/3323 |
| 2008/0222287 | A1* | 9/2008 | Bahl | H04L 41/12 |
| | | | | 709/224 |
| 2009/0141650 | A1* | 6/2009 | Balan | H04L 43/00 |
| | | | | 370/252 |
| 2009/0319436 | A1* | 12/2009 | Andra | G06F 17/2785 |
| | | | | 705/80 |
| 2010/0010952 | A1* | 1/2010 | Kuhn | G06Q 10/04 |
| | | | | 706/47 |
| 2014/0195666 | A1* | 7/2014 | Dumitriu | H04L 12/4625 |
| | | | | 709/223 |
| 2015/0256450 | A1* | 9/2015 | Yang | H04L 45/14 |
| | | | | 370/256 |

OTHER PUBLICATIONS

English Abstract of JP 04-113464 A published Apr. 14, 1992 (2 pages).
English Abstract of JP 2001-044993 A published Feb. 16, 2001 (2 pages).
English Abstract of JP 2010-140296 A published Jun. 24, 2010 (2 pages).

* cited by examiner

<Relationship Graph>
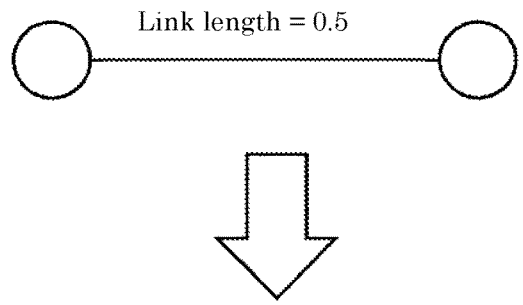
<Virtual Communication Network>
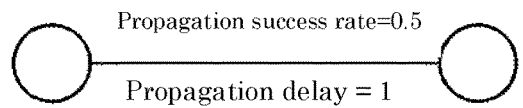
| Link number | Relationship Graph | | Virtual Communication Network | |
|---|---|---|---|---|
| | Link length | Reliability | Propagation success rate (reliability) | Propagation delay (reliability) |
| 1 | 5 | 1 | 0.5 (1) | 1 (1) |
Fig. 4

Ex.
Reference node address    A
Cumulative delay          20
Cumulative delay reliability  1
Volume                    1000
Reliability of volume     1
Number of hops            2
Lifetime                  3
Path                      A→B→C

| A | | |
|---|---|---|
| 20 | 1000 | 1 |
| 1 | B | 2 |
| | C | 3 |

Fig. 5B

Unit: octets

| Reference node address (128) | |
|---|---|
| Cumulative delay (16) | Cumulative delay reliability (16) |
| Volume (32) | |
| Reliability of volume (16) | # of hops (8) | Lifetime (8) |
| payload | |

Fig. 5A

1st hop
Lifetime=2
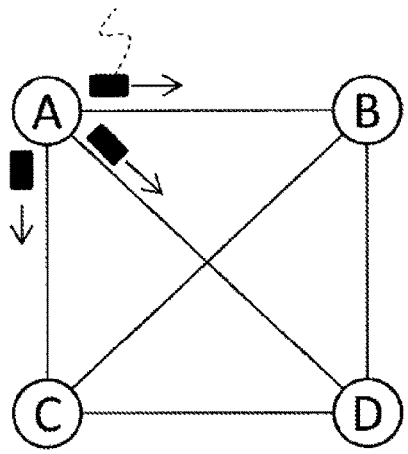
3rd hop
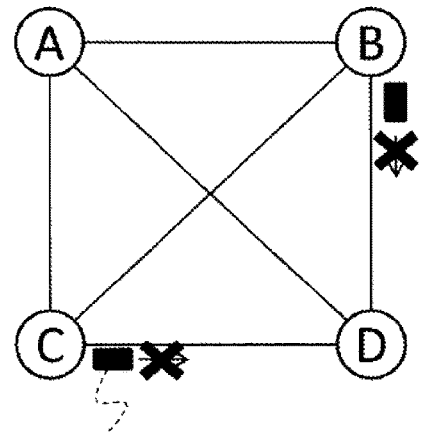
Lifetime=0
2nd hop
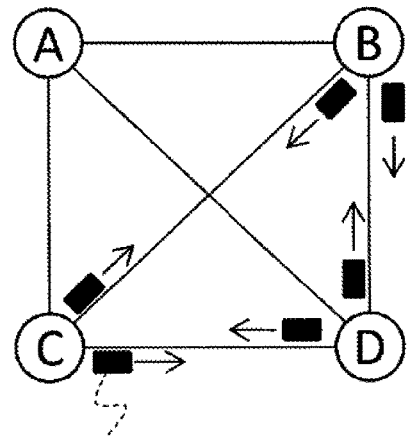
Lifetime=1
Fig. 8

1st hop

Divided packet (volume 400) is propagated

Packet of volume 200 is received from Node A

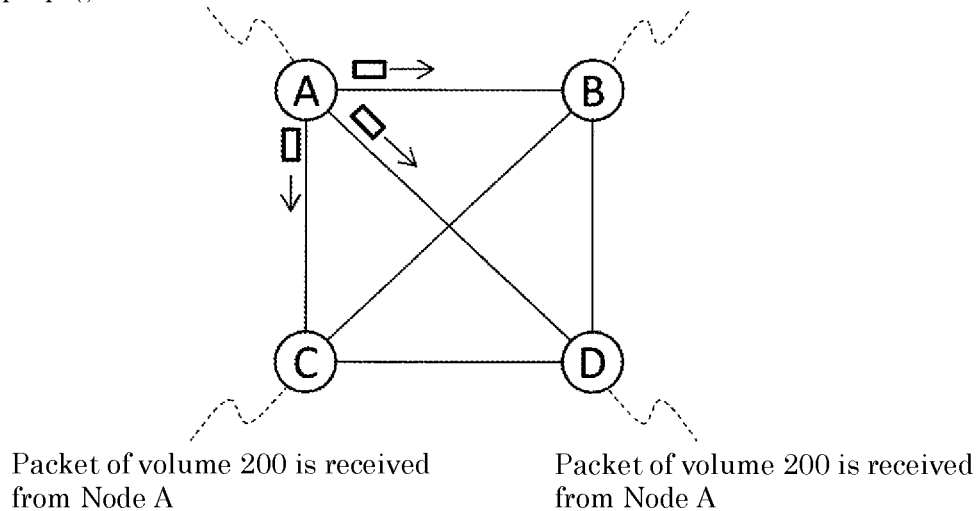

Packet of volume 200 is received from Node A

Packet of volume 200 is received from Node A

2nd hop

Divided packet (volume 100) is propagated
Packet of volume 50 is received from node C

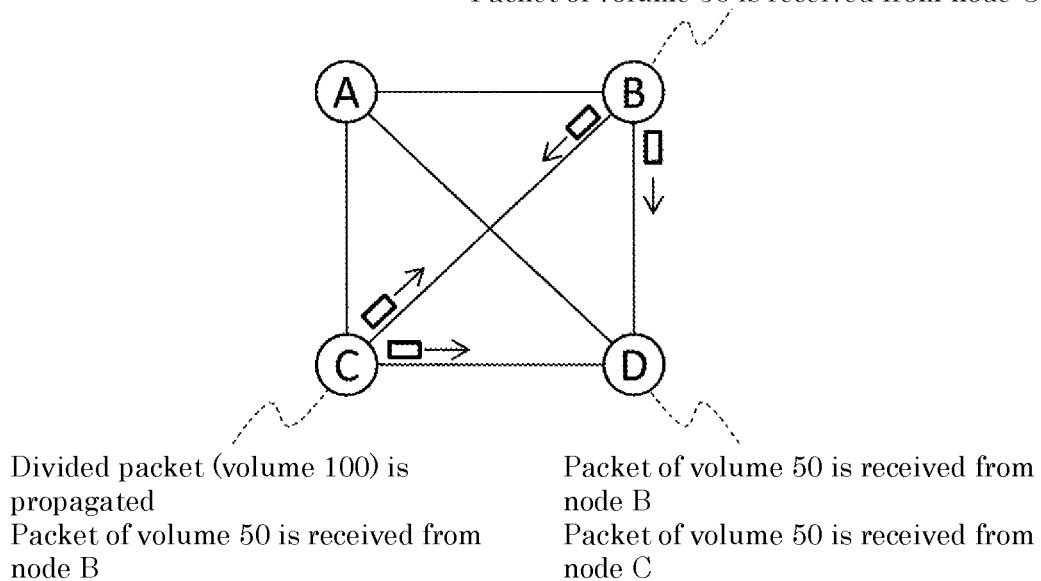

Divided packet (volume 100) is propagated
Packet of volume 50 is received from node B Packet of volume 50 is received from node B
Packet of volume 50 is received from node C

Fig. 10

List of paths from A

| Reference node | Hop | Path |
|---|---|---|
| A | 1 | A→D |
| A | 2 | A→B→D |
| A | 2 | A→C→D |
| A | 3 | A→B→C→D |
| A | 3 | A→C→B→D |

--→ Directivity is evaluated

Mesh net type work (propagation success rate 0.5)

Communication packet list received by D

| Reference node | Hop | Path | Volume |
|---|---|---|---|
| A | 1 | A→D | 200 |
| A | 2 | A→B→D | 50 |
| A | 2 | A→C→D | 50 |

Mesh net type work (propagation success rate 0.75)

Communication packet list received by D

| Reference node | Hop | Path | Volume |
|---|---|---|---|
| A | 1 | A→D | 300 |

Communication packet list received by D

| Reference node | Hop | Path |
|---|---|---|
| A | 2 | A → B → D |
| A | 3 | A → B → C → D |

Via node B commonly

RELATIONSHIP GRAPH EVALUATION SYSTEM

TECHNICAL FIELD

The present invention relates to a relationship graph evaluation system for evaluating a relationship graph in which a plurality of nodes are connected by links.

BACKGROUND ART

Conventionally, to achieve advanced services, it has been attempted to impart detailed attribution information to individual data. On the other hand, an attempt has been considered to utilize relationships among data to services (see Non-Patent Document 1). Especially, social relationships such as a relationship between a person and a person and a relationship between the context of movements of persons and locations have been drawn attention, and the relationship of such data is shown as a relationship graph.

The relationship graph shows, as shown in FIG. 3A, objects, such as, e.g., persons, goods, places, and contents, as nodes, and shows the presence or absence of the mutual relationship of those objects. Further, the strength of the relationship between nodes directly connected with each other is given by a link length, and the strength of the relationship between nodes connected via another node is given by a path length.

By using the information observed in the real world or online as an input source, the object group contained in the input source is created as nodes. Further, a link between nodes is also created, and therefore a small relationship graph (subgraph) is created.

Further, by connecting a plurality of subgraphs via a common node, a large one relationship graph is created, and stored in a database (see Patent Document 1). In connecting them, when there exists the same link redundantly, the link length becomes shorter.

Further, the relationship graph stored in a database is referred to by various applications and utilized. In cases where a relation graph of persons only is formed using information of SNS (Social Networking Service) as an input source, although there is no direct link with a certain person, it is possible to present (recommend) another person which is small in path length as a future friend. For example, in an e-commerce (electronic commerce) by a mobile terminal, in cases where a relationship graph is formed based on a visit history to places and a purchase history of goods, when a certain consumer visited a certain place, it is possible to recommend goods which is small in path length from the consumer and the place on the relationship graph.

PRIOR ART DOCUMENTS

Non-Patent Document

Non-Patent Document 1: R. Shinkuma et al., "New Generation Information Network Architecture Based on Social Metric", IEICE Society Conference, September 2010

Patent Document

Patent Document 1: Japanese Unexamined Patent Application Publication No. 2013-45326

SUMMARY OF THE INVENTION

Problems to be Solved by the Invention

Although a relationship of a certain node with respect to a reference point node is determined by a path from the reference point node to the certain node, there are following problems.

(1) The relationship of the certain node with respect to the reference point node is not always shown in the shortest path.

(2) There exist many paths other than the shortest path if indirect paths (detour paths) are included, and it is not easy to check all of the paths. Even if it is possible to check all of them, it is unclear which path shows the relationship. Especially, in a relationship graph containing a number of nodes and links, it is inefficient to check all of the paths and practically very difficult to do so.

The present invention was made in view of the aforementioned problems, and aims to provide a relationship graph evaluation system capable of effectively evaluating a relationship of a node with respect to a reference point node about a relationship graph in which a plurality of nodes are connected by links, and therefore capable of presenting goods and/or services on the relationship graph to users with a high degree of accuracy.

Means for Solving the Problems

In order to attain the aforementioned objects, the present invention is configured as follows:

A relationship graph evaluation system configured to evaluate a relationship graph in which a plurality of nodes are connected with links, includes:

a relationship graph database configured to store the relationship graph;

a selection information input unit to which selection information regarding a reference point node is input;

a reference point node selection unit configured to select the reference point node based on the selection information regarding the reference point node input by the selection information input unit;

a relationship graph extraction unit configured to extract the relationship graph which becomes an evaluation target from the relationship graph database based on the reference point node selected by the reference point node selection unit;

a virtual communication network creation unit configured to create a virtual communication network based on the relationship graph extracted by the relationship graph extraction unit;

a virtual communication network simulation unit configured to execute simulation by sequentially propagating a virtual communication packet to its adjacent node from the reference point node selected by the reference point node selection unit as a propagate origin in the virtual communication network created by the virtual communication network creation unit;

a relationship evaluation unit configured to evaluate a relationship of the node with respect to the reference point node based on a content of the communication packet received by the node as a result of executing the simulation by the virtual communication network simulation unit; and a relationship evaluation result output unit configured to output an evaluation result of the relationship of the node with respect to the reference point node by the relationship evaluation unit.

Further, each link of the virtual communication network has generally one or more attributes of propagation success rate, preparation delay, and their reliabilities. Further, the communication packet has generally one or more information on a reference point node address, cumulative delay, volume, the number hops, lifetime, and path.

It may be configured such that the relationship evaluation instruction unit instructs a control parameter used for the simulation by the virtual communication network simulation unit.

Further, it may be configured such that the virtual communication network simulation unit records information of received communication packet and then propagates the communication packet to an adjacent node.

Further, it may be configured such that the virtual communication network simulation unit does not make each node propagate the communication packet to a node from which the communication packet was propagated.

Further, it may be configured such that when the virtual communication network simulation unit propagates the communication packet to an adjacent node in each node, the virtual communication network simulation unit propagates by multiplying a propagation success rate of a link with an adjacent node by a volume of the communication packet.

Further, it may be configured such that when the virtual communication network simulation unit propagates the communication packet to an adjacent node in each node, the virtual communication network simulation unit increases the number of hops of the communication packet by one or more, and discards the communication packet when the number of hops has reached a predetermined number of hops.

Further, it may be configured such that when the virtual communication network simulation unit propagates the communication packet to an adjacent node in each node, the virtual communication network simulation unit increases a cumulative delay of the communication packet by the propagation delay of link, and discards the communication packet when the communication packet has reached a predetermined cumulative delay.

Further, it may be configured such that the virtual communication network simulation unit propagates the communication packet to a node having the highest link in propagation success rate among adjacent plural nodes.

Further, it may be configured such that the virtual communication network simulation unit duplicates a communication packet having the same volume in accordance with the number of adjacent nodes in each node, and propagates the duplicated communication packets to adjacent plural nodes, respectively. It is not always necessary to propagate the communication packet to all of adjacent nodes, but the virtual communication network simulation unit may propagate the communication packet only to the node higher in propagation success rate of the link.

Further, it may be configured such that the virtual communication network simulation unit divides the volume of the communication packet depending on the number of adjacent nodes, and propagates the divided communication packets to a plurality of respective nodes. It is not always necessary to propagate the communication packet to all of adjacent nodes, but the virtual communication network simulation unit may propagate the communication packet only to the node higher in propagation success rate of the link.

Further, it may be configured such that the virtual communication network simulation unit divides the volume of the communication packet in proportion to the propagation success rate of the link between adjacent nodes. It is not always necessary to propagate the communication packet to all of adjacent nodes, but the virtual communication network simulation unit may propagate the communication packet only to the node higher in propagation success rate of the link.

Further, it may be configured such that the relationship evaluation unit evaluates a distance from a reference point node to each node based on a sum of a volume of each of communication packets propagated from the reference point node via different paths.

Further, it may be configured such that the relationship evaluation unit evaluates a similarity of each node by comparing a similarity of the number, volume, or path of the communication packets received at each node.

Further, it may be configured such that the relationship evaluation unit evaluates a directness of the node with respect to the reference point node based on the minimum number of hops among the number of hops of each communication packet propagated from the reference point node via different paths.

Further, it may be configured such that the relationship evaluation unit evaluates a dependency of the node with respect to the reference point node based on the number and volume of communication packets propagated from the reference point node via different paths.

Further, it may be configured such that when each of a plurality of communication packets propagated from the reference point node via difference paths is received via a common relay node in each node, the relationship evaluation unit evaluates such that the relay node is larger in influence degree with respect to the relationship between the reference point node and the node.

Further, it may be configured such that the relationship evaluation unit evaluates, in each node, a robustness of the node based on the number of communication packets propagated from the reference point node via different paths.

Further, it may be configured such that the relationship evaluation unit evaluates a relationship of the node with respect to the reference point node based on a content of the communication packet received at the node in a process that the communication packet is propagated by the virtual communication network simulation unit every predetermined number of hops or every predetermined time. The relationship evaluation result output unit arbitrarily outputs an intermediate evaluation result evaluated by the relationship evaluation unit.

Further, it may be configured such that the reference point node selection unit selects a plurality of reference point nodes, and the relationship evaluation unit evaluates, in each node, at least one of distance, directness, dependency, similarity with respect to each reference point node, an influence degree of a relay node, or robustness.

Further, it may be configured such that the virtual communication network simulation unit sequentially propagates the communication packet to adjacent nodes from a plurality of nodes within a predetermined range from the reference point node as propagation origins, and the relationship evaluation unit extracts characteristic nodes or a partial networks based on a distribution of communication packets received at nodes within the predetermined range and evaluates them.

Effects of the Invention

According to the present invention, as to the relationship graph in which a plurality of nodes are connected with links, a relationship of each node with respect to the reference point node can be effectively evaluated, which in turn can present goods and/or services on the relationship graph to users with a high degree of accuracy.

BRIEF DESCRIPTION OF THE DRAWINGS

FIG. 4 illustrates a propagation success rate, a propagation delay, and their reliabilities of links of the virtual communication network.

FIG. 5 illustrates a structure of a communication packet.

FIG. 8 is a diagram showing a virtual communication network according to Example 1.

FIG. 10 is a diagram showing a virtual communication network according to Example 3.

EMBODIMENTS FOR CARRYING OUT THE PRESENT INVENTION

Next, an embodiment of a relationship graph evaluation system 1 according to the present invention (hereinafter referred to as "this system 1") will be described with reference to FIGS. 1 to 7.

[General Structure]

Figure 1:
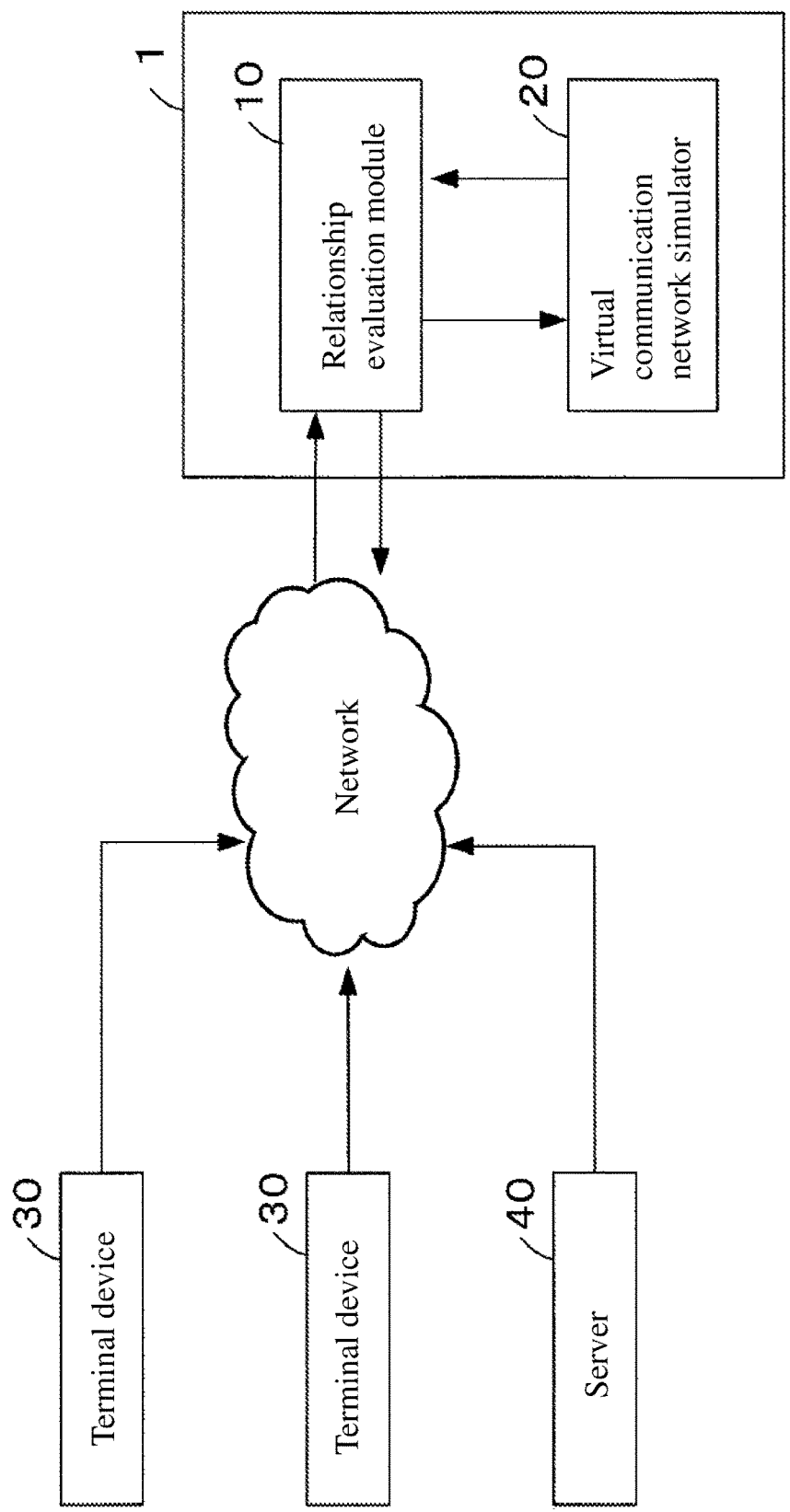
FIG. 1 is a diagram showing an entire structure of a system model of this system.

FIG. 1 is a diagram showing an entire structure of a system model including this system 1. This system 1 is, as shown in FIG. 1, provided with a relationship evaluation module 10 configured to execute an evaluation of a relationship, and a virtual communication network simulator 20 configured to create and execute a virtual communication network.

The relationship evaluation module 10 is capable of communicating with terminal devices 30 and other server 40 via a computer network such as the Internet. The terminal device 30 is not specifically limited as long as it is a device, such as, e.g., a personal computer, a cellular phone, a smart phone, and other mobile terminal, which is capable of being connected to a computer network. The server 40 is, for example, a server constituting a service application.

The virtual communication network simulator 20 is connected to the relationship evaluation module 10 in a communicable manner. This virtual communication network simulator 20 may be the same server as or different from the aforementioned relationship evaluation module 10.

Each function of this system 1 is executed when a computer program installed in a storage of a computer functioning as a server is executed by the computer. This computer program may be assigned or sold in a state of being stored in a recording medium.

Further, the result of each processing executed in this system 1 may be stored in a cache server to increase the processing speed.

[Structure of Relationship Evaluation Module 10]

Figure 2:
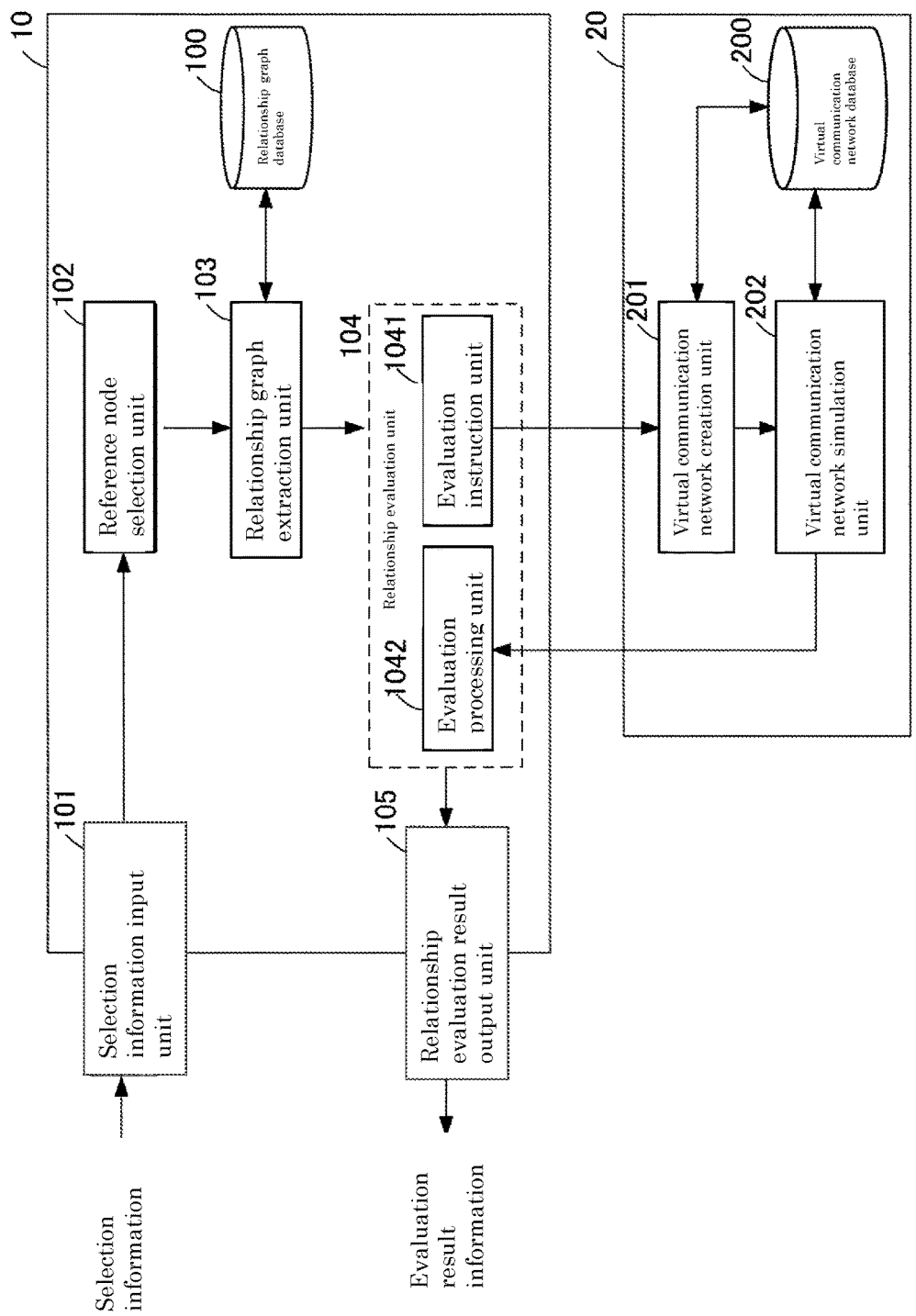
FIG. 2 is a diagram showing a functional structure of this system.

The relationship evaluation module 10 is, as shown in FIG. 2, provided with a relationship graph database 100, a selection information input unit 101, a reference point node selection unit 102, a relationship graph extraction unit 103, a relationship evaluation unit 104, and a relationship evaluation result output unit 105.

Figure 3A:
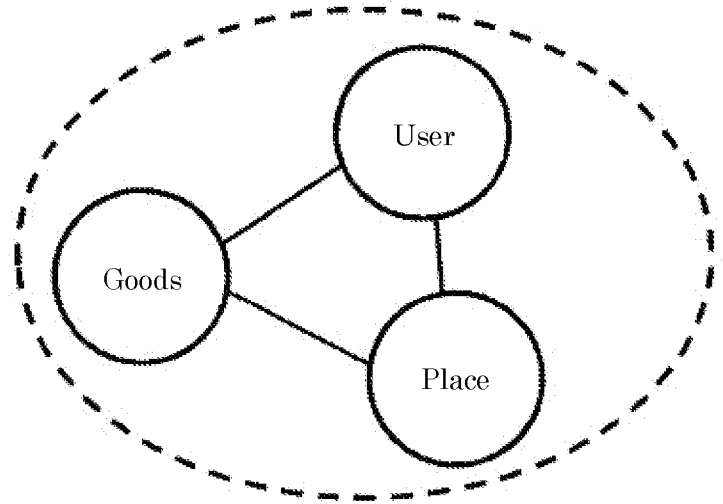
FIG. 3 is a conceptual diagram of a relationship graph and a virtual communication network.
Figure 3B:
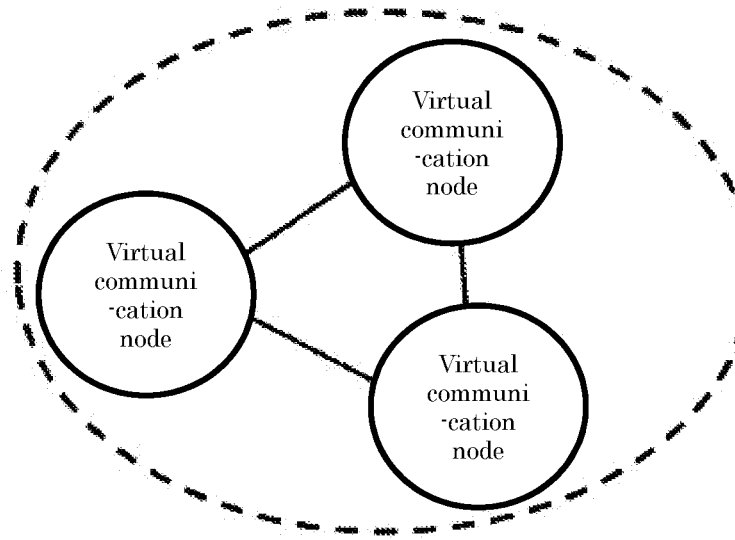

The relationship graph database 100 is configured to store relationship graphs. This relationship graph represents, as shown in FIG. 3A, objects, such as, e.g., people, goods, places, and contents, as nodes, and represents the presence or absence of the mutual relationship of these objects by links. The strength of the relationship between nodes which are directly interconnected is given by a link length, and the strength of the relationship between nodes which are connected via another node is given by a path length. By using information observed in the real-world or online as an input source, the object group contained in the input source is created as a node. Further, links among nodes are created, which creates small relationship graphs (subgraphs). Further, by connecting a plurality of subgraphs via a common node, a large single relationship graph is created. This is stored in the relationship graph database 100. At the time of connection, the more there exists the same link in an overlapped manner, the shorter the link length becomes. The creation method of the relationship graph is concretely described in the aforementioned Patent Document 1.

To the selection information input unit 101, selection information regarding a reference point node transmitted from the terminal device 30 or the server 20 via the network is input. This selection information denotes information which becomes a candidate for a reference point node of, for example, a user himself/herself, a place where a user is located, or goods that a user is interested in.

The reference point node selection unit 102 is configured to select a reference point node based on selection information regarding a reference point node input by the selection information input unit 101. For example, among information which may become a reference point node of, for example, a user himself/herself, a place where a user is located, or goods that a user is interested in, certain information is selected as a reference point node.

The relationship graph extraction unit 103 is configured to extract a relationship graph which becomes an evaluation target from the relationship graph database 100 based on the reference point node selected by the reference point node selection unit 102. For example, when information of goods that a user is interested in is selected as a reference point node, the relationship graph extraction unit 103 extracts a relationship graph including the information of the goods.

The relationship evaluation unit 104 is configured to evaluate a relationship of each node with respect to a reference point node, and is provided with, in this embodiment, an evaluation instruction unit 1041 and an evaluation processing unit 1042.

The evaluation instruction unit 1041 specifies a control parameter which will be used for the later described simulation by a virtual communication network simulation unit 202 of a virtual communication network simulator 20, and transmits the relation graph extracted by the relationship graph extraction unit 103 to the virtual communication network simulator 20 together with the control parameter. This control parameter is a parameter which controls the virtual communication network simulator, and includes various types of parameters, such as, e.g., a lifetime, the presence or absence of a duplicate of the communication packet, the presence or absence or divisional pattern of a communication packet, and similarity of the number of communication packets/volume path.

The evaluation processing unit 1042 evaluates the relationship of each node with respect to the reference point node based the contents of the communication packet received in each node, as a result of executing simulation by the virtual communication network simulation unit 202 in the virtual communication network simulator 20. The evaluation of the relationship of each note with respect to the reference point node will be described concretely in the following Example 1 to Example 10.

The relationship evaluation result output unit 105 outputs the evaluation result of the relationship of each node by the relationship evaluation unit 104. When outputting the evaluation result of the relationship of each node, the output is performed after processing the evaluation result into a format capable of being understood by the terminal device 30 or the server 40 (service application).

[Structure of Virtual Communication Network Simulator 20]

As shown in FIG. 2, the virtual communication network simulator 20 is provided with a virtual communication network database 200, a virtual communication network creation unit 201 and a virtual communication network simulation unit 202.

The virtual communication network creation unit 201 receives a relationship graph and a control parameter transmitted from the evaluation instruction unit 1041 of the relationship evaluation unit 104 in the relationship evaluation module 10, and then creates a virtual communication network based on the relationship graph and the control parameter.

This virtual communication network is a network in which, as shown in FIG. 3A, nodes and links of the relationship graph are replaced with nodes and links of a virtual communication network. As shown in FIG. 4, each link of the virtual communication network represents a propagation success rate, a propagation delay, and their reliabilities, and all of these are values determined by the link length of the relationship graph. For example, by the link length on the relationship graph (e.g., 5 in link length), the propagation success rate on the virtual communication network (as the link length becomes longer, the propagation success rate deteriorates. 0.5 in this embodiment), and the propagation delay (as the link length becomes longer, the propagation delays. 1 in this embodiment) are determined. Further, by the reliability of the link length on the relationship graph, the propagation success rate and the reliability (1 in this embodiment) of the propagation delay are determined.

The virtual communication network database 200 temporarily stores the virtual communication network created by the virtual communication network creation unit 201.

The virtual communication network simulation unit 202 sequentially propagates, in the virtual communication network created by the virtual communication network creation unit 201, a virtual communication packet to an adjacent node from a reference point node selected by the reference point node selection unit 102 as a propagation origin to execute simulation based on a control parameter.

This communication packet includes, as shown in FIG. 5A, information on the reference point node address, the cumulative delay, the volume, the number of hops, the lifetime, and the path. Further, the communication packet includes the volume and the reliability of the cumulative delay as secondary information. For example, when the communication packet includes information on the reference point node address of A, the cumulative delay of 20, the cumulative delay reliability of 1, the volume of 1,000, the reliability of the volume of 1, the number of hops of 2, the lifetime of 3, and the path of A→B→C, the structure becomes as shown in FIG. 5B.

The reference point node propagates a communication packet having a previously decided initial volume to an adjacent node. The node that received the communication packet records the information of the communication packet and then propagates to an adjacent node. In the same manner, each node sequentially propagates the communication packet to an adjacent node. At this time, it is preferable to have a structure avoiding an unnecessary loop such that the node does not propagate the communication packet to a node from which the communication packet was propagated.

Figure 6:
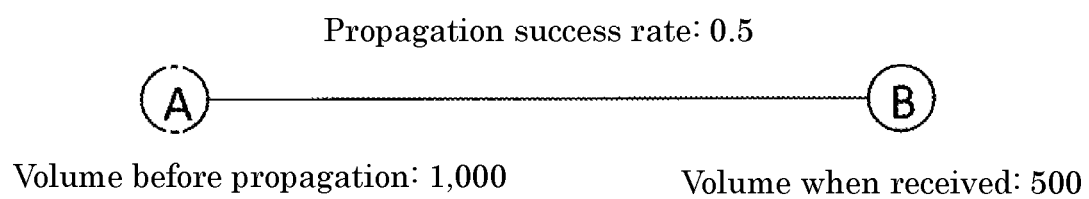
FIG. 6 is a diagram explaining multiplying a volume of the communication packet by a propagation success rate.

Further, as shown in FIG. 6, when propagating the communication packet to an adjacent node, it is preferable that each node propagate the communication packet to the adjacent node by multiplying the volume of the communication packet by the propagation success rate of the link of the adjacent node. For example, in cases where the propagation success rate of the link between a certain node A and an adjacent node B is 0.5, when propagating the communication packet having a volume of 1,000 to the node B, the node A propagates a communication packet having a volume of 500 obtained by multiplying the propagating success rate of 0.5 by the volume of 1,000 of the communication packet to the node B.

The simulation result by the virtual communication network simulation unit 202 is constituted by the contents of the communication packet mainly received by each node, and transmits to the relationship evaluation unit 104 of the relationship evaluation module 10. The execution method of the simulation by the virtual communication network simulation unit 202 will be described in detail in the following Examples 1 to 10.

[Operation of this System 1]

Figure 7:
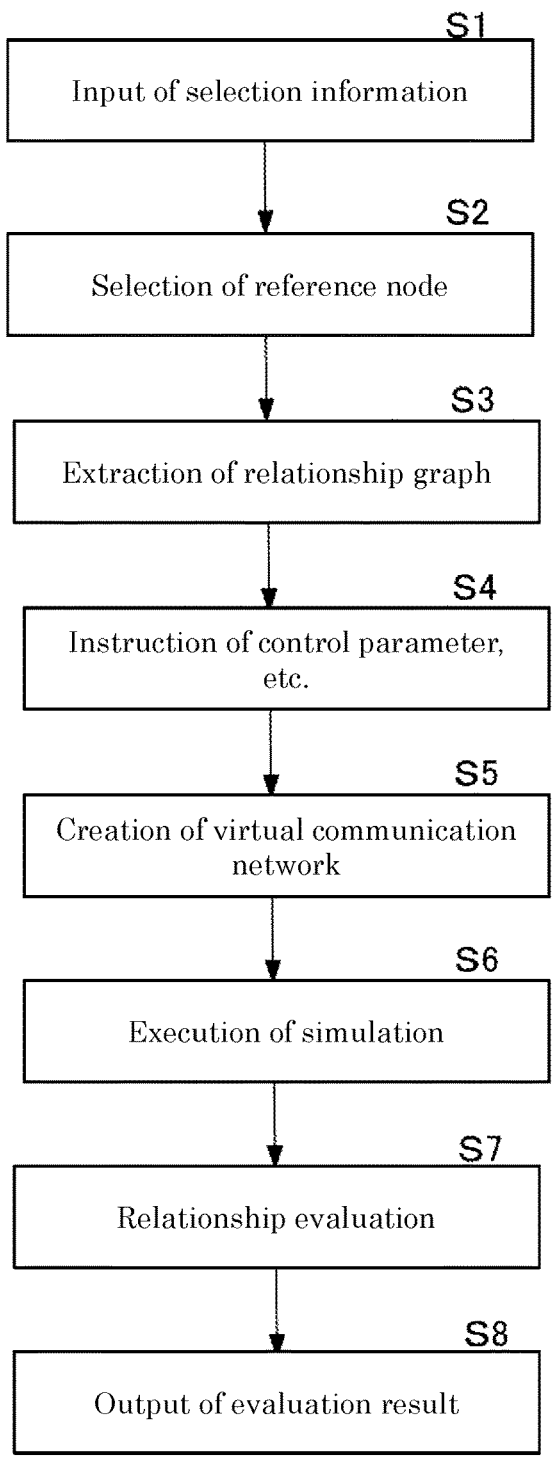
FIG. 7 is a flowchart showing operations of this system.

Next, the operation of this system 1 will be described with reference to the flowchart shown in FIG. 7. In the following description, "Step" will be abbreviated as "S".

Initially, in the relationship evaluation module 10, to the selection information input unit 101, the selection information regarding the reference point node transmitted from the terminal device 30 or the server 20 via the network is input (S1).

Then, the reference point node selection unit 102 selects the reference point node based on the selection information regarding the reference point node input by the selection information input unit 101 (S2).

Then, the relationship graph extraction unit 103 extracts a relationship graph which becomes an evaluation target from the relationship graph database 100 based on the reference point node selected by the reference point node selection unit 102 (S3).

Further, the evaluation instruction unit 1041 of the relationship evaluation unit 104 specifies a control parameter, and transmits the relationship graph extracted by the relationship graph extraction unit 103 to the virtual communication network simulator 20 together with the control parameter (S4).

Next, in the virtual communication network simulator 20, the virtual communication network creation unit 201 receives the relationship graph and the control parameter transmitted from the evaluation instruction unit 1041 of the relationship evaluation unit 104 in the relationship evaluation module 10, and then creates a virtual communication network based on the relationship graph and the control parameter (S5).

Then, the virtual communication network simulation unit 202, in the virtual communication network created by the virtual communication network creation unit 201, sequentially propagates the communication packet to an adjacent node from the reference point node selected by the reference point node selection unit 102 as a propagation origin, and executes simulation based on the control parameter (S6). The simulation result by the virtual communication network simulation unit 202 is constituted by mainly the contents of the communication packet received by each node, and is transmitted to the relationship evaluation unit 104 of the relationship evaluation module 10.

Next, again in the relationship evaluation module 10, the evaluation processing unit 1042 evaluates the relationship of each node with respect to the reference point node based the contents of the communication packet received in each node in the virtual communication network simulator 20 (S7). The evaluation of the relationship of each note with respect to the reference point node will be described concretely in the following Example 1 to Example 10.

The relationship evaluation result output unit 105 outputs the evaluation result of the relationship of each node by the relationship evaluation unit 104. When outputting the evaluation result of the relationship of each node, the output is performed after processing the evaluation result into a format capable of being understood by the terminal device 30 or the server 40 (service application).

In this embodiment, the simulation is executed by the virtual communication network simulation unit 202, and at the time when the communication packet has completed a certain propagation, the evaluation processing unit 1042 of the relationship evaluation unit 104 evaluates the relationship of the node with respect to the reference point node based on the contents of the communication packet received by the node. Then, the relationship evaluation result output unit 105 outputs the evaluation result. Further, it may be configured such that, in the process in which the communication packet is being propagated by the virtual communication network simulation unit 202, every predetermined number of hops of the communication packet or every predetermined time, based on the contents of the communication packet received by the node, the evaluation processing unit 1042 of the relationship evaluation unit 104 evaluates the relationship of the node with respect to the reference point node, and the relationship evaluation result output unit 105 outputs the intermediate evaluation result.

EXAMPLES

Next, Examples 1 to 10 according to the present invention will be described with reference to the drawings. In Examples 1 to 9, each node is controlled so as not to propagate the communication packet to a node from which the communication packet was propagated.

Example 1

Propagate Control by Lifetime

In Example 1, the lifetime of the communication packet is defined by the number of hops or time, and the communication packet that reached the lifetime will not be propagated any more, and will be discarded. The lifetime is a control parameter capable of being controlled by an outside (the terminal device 30 or the server 40).

Concretely, the virtual communication network simulation unit 202 increments the number of hops of the communication packet by one when the communication packet is propagated to an adjacent node in each node. Further, the virtual communication network simulation unit 202 increments the cumulative delay of the communication packet by the propagation delay of the link when the communication packet is propagated to an adjacent node in each node. The virtual communication network simulation unit 202 discards the communication packet when the communication packet has reached a predetermined number of hops or when the communication packet has reached a predetermined cumulative delay.

For example, as shown in FIG. 8, in the virtual communication network in which nodes A, B, C, and D are mutually connected via links, the communication packet is propagated from the node A to its adjacent nodes B, C, and D ($1^{st}$ hop: A→B, A→C, A→D). Next, the communication packet is propagated from each node B, C, and D to its adjacent note ($2^{nd}$ hop: A→B→C, A→B→D, A→C→D, A→C→B, A→D→B, A→D→C). Here, when the lifetime is set such that the number of hops is 2, each node would not propagate the communication packet any more.

As described above, the evaluation range in the virtual communication network can be controlled by the lifetime, which in turn can prevent an increase of unnecessary processing caused by propagation of the communication packet to an unnecessary range.

Example 2

Propagation Method of Communication Packet

Example 2-1

In this Example, the communication packet is propagated to a node higher in propagation success rate.

That is, in each node, the virtual communication network simulation unit 202 propagates the communication packet only to a node having a link which is the highest in propagation success rate propagate.

Figure 9A:
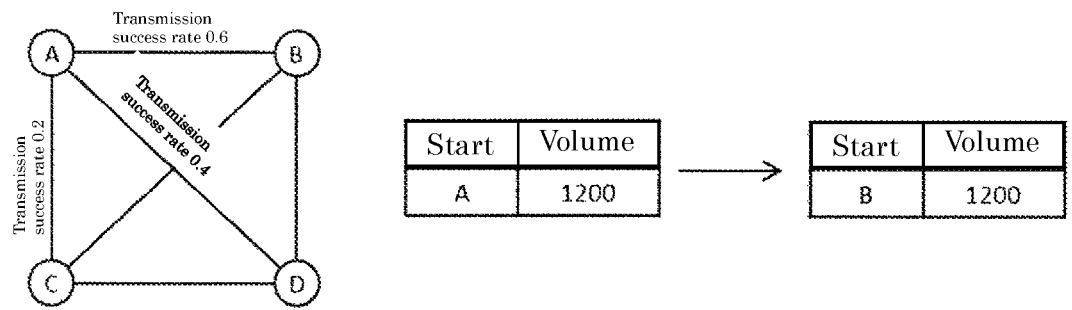
FIG. 9 is a diagram showing a virtual communication network according to Example 2.

For example, as shown by FIG. 9A, in the virtual communication network in which nodes A, B, C, and D are mutually connected via links, at the node A, the communication packet is propagated only to the node B having a link which is the highest in propagation success rate among a plurality of adjacent nodes B, C, and D. At the next node and thereafter, the communication packet is propagated in the same manner.

Example 2-2

In this Example, when there exist a plurality of adjacent nodes, the communication packet is reproduced by an arbitrary number. Whether or not the communication packet is to be reproduced is a control parameter that can be controlled from an outside (the terminal device 30 or the server 40).

Concretely, the virtual communication network simulation unit 202 reproduces, at each node, the communication packet having the same volume depending of the number of adjacent nodes, and propagates the reproduced communication packets to respective plurality of nodes.

Figure 9B:
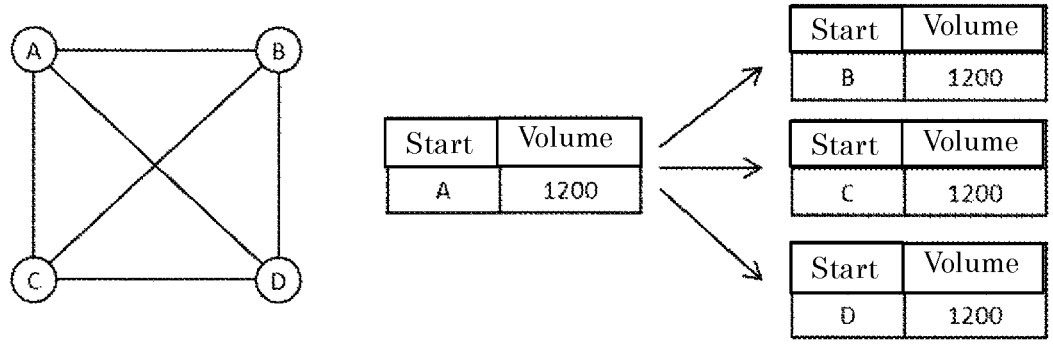

For example, as shown in FIG. 9B, in the virtual communication network in which nodes A, B, C, and D are mutually connected via links, at the node A, the communication packet having the same volume 1,200 is reproduced by three corresponding to the number of adjacent nodes B, C, and D, and the reproduced communication packets having the volume 1,200 are propagated to the respective adjacent nodes B, C, and D. And at the next node and thereafter, the communication packet is propagated in the same manner.

Example 2-3

In this Example, when there exist a plurality of adjacent nodes, the communication packet is divided into an arbitrary number. Whether or not the division is performed or the divisional pattern is a control parameter that can be controlled from an outside (the terminal device 30 or the server 40).

Concretely, at each node, the virtual communication network simulation unit 202 divides the volume of the communication packet depending on the number of adjacent nodes, and propagates the divided communication packets to respective nodes. In this Example, the virtual communication network simulation unit 202 divides the volume of the communication packet evenly.

Figure 9C:
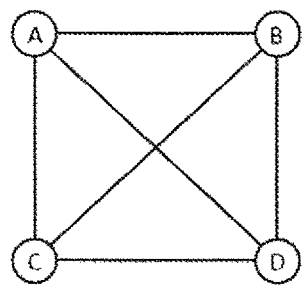

For example, as shown in FIG. 9C, in the virtual communication network in which nodes A, B, C, and D are mutually connected via links, at the node A, the communication packet having a volume of 1,200 is evenly divided into three communication packets each having a volume of 400 corresponding to the number of adjacent nodes B, C, and D, and the divided communication packets each having a volume of 400 are propagated to the respective adjacent nodes B, C, and D. And, at the next node and thereafter, the communication packet is propagated in the same manner.

Example 2-4

In this Example, the volume of the communication packet is divided in proportion to the propagation success rates of links.

Concretely, the virtual communication network simulation unit 202 divides the volume of the communication packet in proportion to the propagation success rate of the link between adjacent nodes.

Figure 9D:
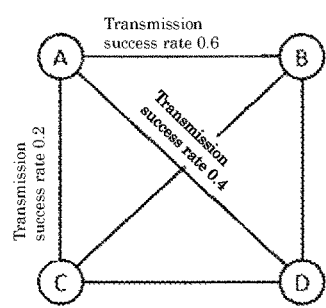

For example, as shown in FIG. 9D, in the virtual communication network in which nodes A, B, C, and D are mutually connected via links, at the node A, the communication packet having a volume of 1,200 is divided into three communication packets, i.e., a communication packet having a volume of 600, a communication packet having a volume of 200, and a communication packet having a volume of 400, corresponding to the link success rates between adjacent nodes B, C, and D (link between A-B: 0.6, link between A-C: 0.2, link between A-D: 0.4), and the divided communication packets, i.e., a communication packet having a volume of 600, a communication packet having a volume of 200, and a communication packet having a volume of 400, are propagated to the respective adjacent nodes B, C, and D. And, at the next node and thereafter, the communication packet is propagated in the same manner.

Example 3

Evaluation by Volume Sum of Communication Packets

In Example 3, based on the sum of volumes of the communication packets received by the node, the distance from the reference point node to each node is evaluated.

Concretely, in each node, the relationship evaluation unit 104 evaluates, at each node, the distance from the reference point node to each node based on the sum of the volume of each of communication packets propagated from the reference point node via different paths.

For example, as shown in FIG. 10, in the virtual communication network in which nodes A, B, C, and D are mutually connected via links (all link propagation success rate: 0.5), at the node A, the communication packet having a volume of 1,200 is evenly divided into three communication packets each having a volume of 400 corresponding to the number of adjacent nodes B, C, and D, and the divided communication packets each having a volume 400 of are propagated to the respective adjacent nodes B, C, and D. Since the success rate of each of all links is 0.5, a communication packet having a volume of 400×0.5=200 is received by each of the nodes B, C, and D. Next, also at each of the nodes B, C and D, the communication packet having a volume of 400 is evenly divided by two, which is the number of adjacent nodes, into a volume of 100 and a volume of 100, the divided communication packets each having a volume of 100 are propagated to respective adjacent nodes. At this time, since the success rate of each of all the links is the same 0.5, the adjacent node receives a communication packet having a volume of 100×0.5=50.

Thus, in cases where the number of lifetime is 2, the node B receives the communication packet having a volume of 200 via paths A→B, the communication packet having a volume of 50 via paths A→C→B, and the communication packet having a volume of 50 via paths A→D→B. Therefore, the sum of the volumes of the communication packets is 300. Using the sum of 300, the distance from the reference point node A to the node B is evaluated.

Therefore, on the original relationship graph, a distance between a certain consumer and a certain place, or a distance between a certain consumer and certain goods, etc., can be evaluated considering not only the minimum path but also another paths.

Example 4

Evaluation of Similarity of Nodes

In this Example, the similarity of each node is evaluated from the contents of communication packets received at each node.

Concretely, the relationship evaluation unit 104 evaluates the similarity of each node by comparing the similarity of the number, volume, or path of the communication packets received at each node. The similarity of the number, volume, or paths of the communication packets is a control parameter that can be controlled from an outside (the terminal device 30 or the server 40).

For example, in the aforementioned Example 3, in cases where the number of hops of the lifetime is 2, the node B receives the communication packet having a volume of 200 via paths A→B, the communication packet having a volume of 50 via paths A→D→B, and the communication packet having a volume of 50 via paths A→C→B, and therefore the sum of the volumes of the communication packets is 300. Further, the node C receives the communication packet having a volume of 200 via paths A→C, the communication packet having a volume of 50 via paths A→D→C, and the communication packet having a volume of 50 via paths A→B→C, and therefore the sum of the volumes of the communication packets is 300.

Figure 11:
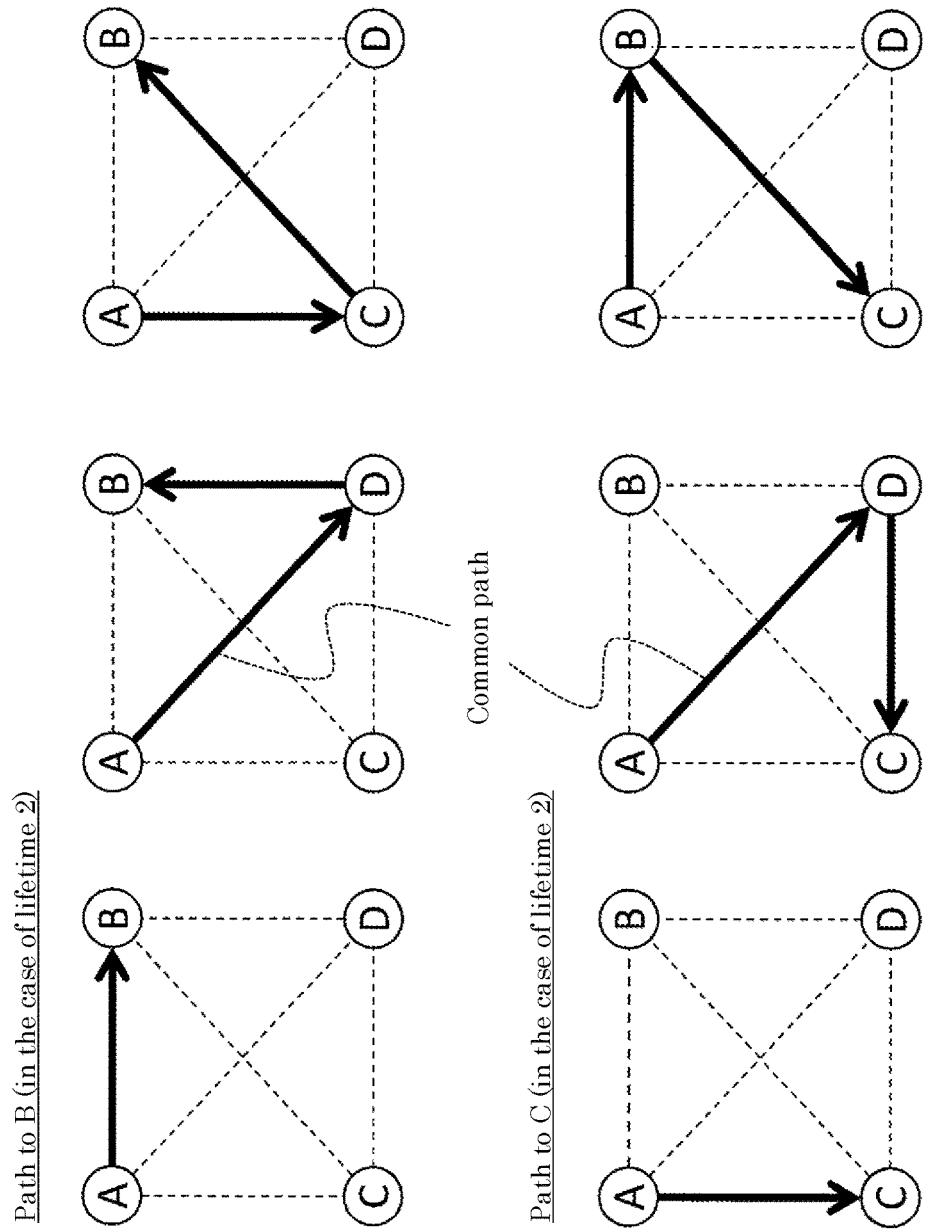
FIG. 11 is a diagram showing a virtual communication network according to Example 4.

Thus, as shown in FIG. 11, as for the node B and the node C, since the number of communication packets received is 3, the distance (volume) is the same 300, and the paths has a common path A→D, the similarity between the node B and the node C can be evaluated.

Therefore, on the original relationship graph, it becomes possible to evaluate the similarity of goods completely different in attribute, consumers, and places.

In this Example, although the similarity of each node is evaluated by comparing all of the number, volumes, and paths of the communication packets, the similarity of each node may be evaluated by comparing at least one of them.

Example 5

Evaluation of Directness of Nodes

In this Example, the directness of each node is evaluated based on the minimum number of hops of communication packets at each node.

Concretely, in each node, the relationship evaluation unit 104 evaluates the directness of the node with respect to the reference point node based on the minimum number of hops among the number of hops of each communication packet propagated from the reference point node via different paths.

Figure 12:
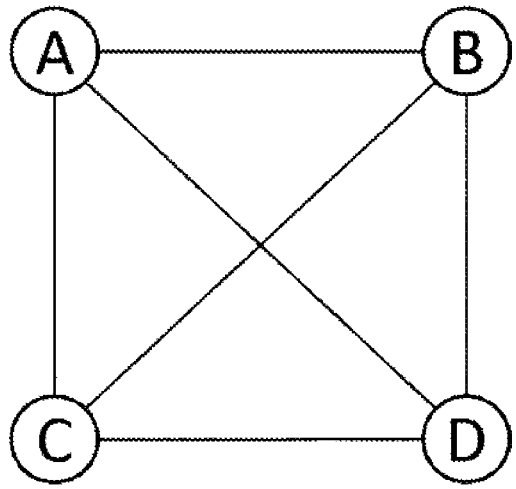
FIG. 12 is a diagram showing a virtual communication network according to Example 5.

For example, as shown in FIG. 12, in the virtual communication network in which nodes A, B, C, and D are mutually connected via links, it is assumed that the communication packet is propagated from the node A to its adjacent nodes B, C, and D, further propagated sequentially to its adjacent nodes, and the lifetime is completed when the number of hops is 3.

Thus, the paths to the node D include a path A→D in which the number of hops is 1, paths A→B→D and A→C→D in which the number of hops is 2, and paths A→B→C→D and A→C→B→D in which the number of hops is 3. Among them, since the minimum number of hops is 1 of the path A→D, the directness of the node D with respect to the node A is evaluated from the minimum number of hops which is 1.

Therefore, on the original relationship graph, goods or places which are low in directness for a certain consumer have no direct contact point, and are connected indirectly.

Example 6

Evaluation of Dependency of Nodes

In this Example, the dependency of each node is evaluated. As the communication packet having a larger volume is propagated via fewer numbers of paths, the dependency becomes higher.

Concretely, in each node, the relationship evaluation unit 104 evaluates the dependency of the node with respect to the reference point node based on the number and volume of communication packets propagated from the reference point node via different paths.

Figure 13A:
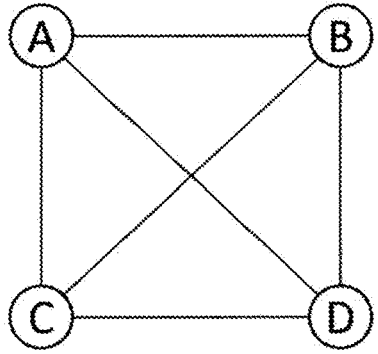
FIG. 13 is a diagram showing a virtual communication network according to Example 6.

For example, as shown in FIG. 13A, in a mesh-type virtual communication network in which nodes A, B, C, and D are mutually connected via links (the propagation success rate of all the links is 0.5), it is assumed that the communication packets each having a divided volume of 400 are propagated from the node A to its adjacent nodes B, C, and D by multiplying the volume by the propagation success rate, further propagated sequentially to its adjacent nodes by multiplying the volume by the propagation success rate, and the lifetime is completed when the number of hops is 2. At this time, the node D receives the communication packet having a volume of 200 via the path A→D, the communication packet having a volume of 50 via the path A→B→D, and the communication packet having a volume of 50 via the path A→C→D.

Figure 13B:
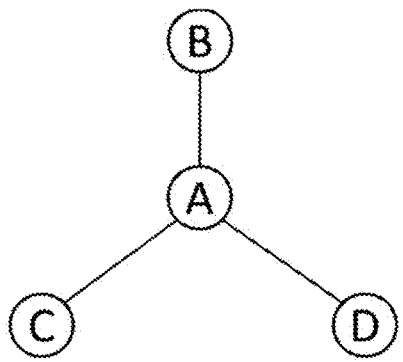

On the other hand, as shown in FIG. 13B, in a virtual communication network in which nodes B, C, and D are connected via links centering a node A (the propagation success rate of each of all the links is 0.75), the communication packets each having a divided volume of 400 are propagated from the node A to its adjacent nodes B, C, and D by multiplying the volume by the propagation success rate. At this time, to the node D, a communication packet having a volume of 300 of a path A→D is propagated.

Thus, in the virtual communication networks shown in FIG. 13A and FIG. 13B, the sum of the volumes of the communication packets to be propagated to the node D is 300 in either case. However, in the star-shape virtual communication network shown in FIG. 13B, since the communication package having a larger volume is propagated via one path, it is evaluated that the dependency of the node D with respect to the node A is higher.

Therefore, in the original relationship graph, it can be evaluated such that the dependency of the node D with respect to the node A is higher, which in turn can evaluate such that the co-occurrence of the object A and the object D is higher.

Example 7

Evaluation of Influence Degree of Relay Nodes

In this Embodiment, it is evaluated which relay node is large in influence degree between the reference point node and a certain node.

Concretely, the relationship evaluation unit 104 evaluates that, when a plurality of communication packets propagated from the reference point node via difference paths are received in each node, the relay node is larger in influence degree with respect to the relationship between the reference point node and the node.

Figure 14:
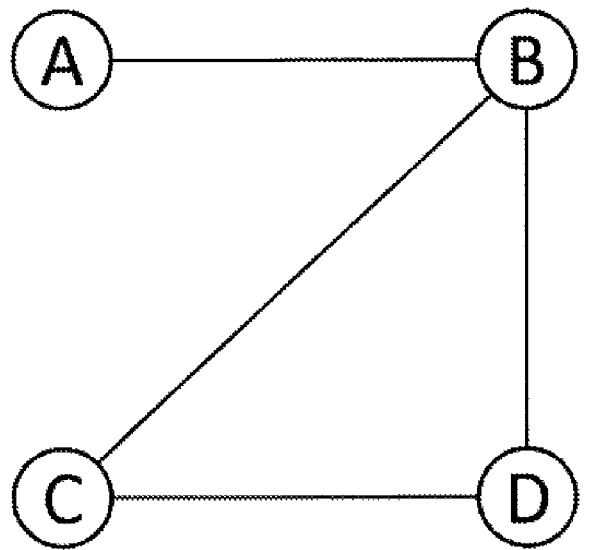
FIG. 14 is a diagram showing a virtual communication network according to Example 7.

For example, as shown in FIG. 14, in the virtual communication network in which nodes A and B, nodes B and C, nodes B and D, and nodes C and D are mutually connected via a link respectively, from the node A, a communication packet is propagated to the adjacent node B, the node B propagates the communication packet to the adjacent nodes C and D, and the node C propagates the communication packet to the node D. At this time, to the node D, the communication packet of the path A→B→D and the communication packet of the path A→B→C→D are propagated. Comparing the paths of these communication packets, since these communication packets go through the common relay node B, it can be evaluated such that the influence degree of the relay node B is larger between the node A and the node D.

Therefore, it can be evaluated such that the influence degree of the relay node B is larger between the node A and the node D in the original relationship graph.

Example 8

Evaluation of Robustness of Nodes

In this Example, a robustness of a certain node is evaluated.

Concretely, in each node, the relationship evaluation unit 104 evaluates a robustness of a node based on the number of communication packets propagated from the reference point node via a plurality of paths.

Figure 15B:
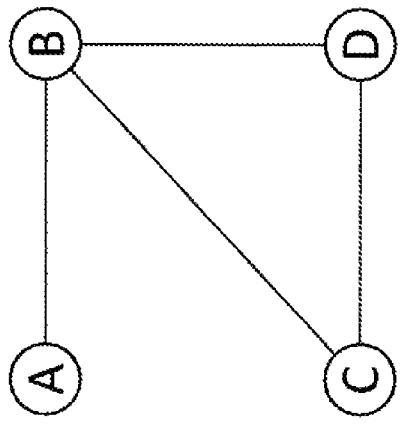
FIG. 15 is a diagram showing a virtual communication network according to Example 8.
Figure 15A:
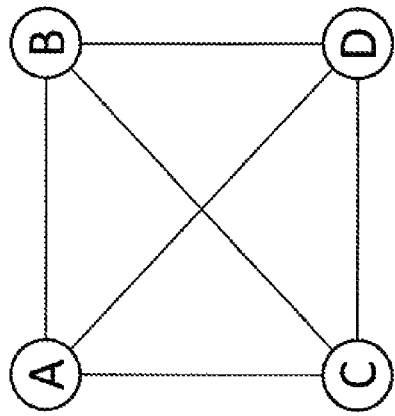

For example, as shown in FIG. 15A, in the former virtual communication network in which nodes A, B, C, and D are mutually connected via links, it is assumed that a communication packet is propagated from the node A to its adjacent nodes B, C, and D, further propagated sequentially to its adjacent nodes, and the lifetime is completed when the number of hops is 3. In this case, to the node D, the communication packet via the path A→D, the communication packet via the path A→B→D, the communication packets via the path A→C→D, the communication packet via the path A→B→C→D, and the communication packets via the path A→C→B→D are propagated, and the number of communication packets will be 5.

On the other hand, in the latter virtual communication network in which nodes A and B, B and C, B and D, and C and D are mutually connected via links, a communication packet is propagated from the node A to its adjacent node B, the node B propagates the communication packet to its adjacent nodes C and D, and the node D propagates the communication packet to its adjacent node D. In this case, to the node D, the communication packet via the path A→B→D, and the communication packet via the path A→B→C→D are propagated, and the number of communication packets will be 2.

Thus, in the virtual communication networks shown in FIG. 15A and FIG. 15B, the number of the former communication packets is 5, and the number of the latter communication packets is 2. Since the number of communication packets of the former virtual communication network is larger than the number of communication packets of the latter virtual communication network, it can be evaluated such that the robustness of the node D with respect to the node A is higher.

Therefore, in the original relationship graph, it can be evaluated such that the robustness of the node D with respect to the node A is higher, which in turn can evaluate the hardness of expiration of the relationship between nodes based on the robustness.

Example 9

Evaluation of Node with Respect to a Plurality of Reference Point Nodes

In this Example, a plurality of reference point nodes are set, and a node with respect to each reference point node will be evaluated. When evaluating the node, at least one of the distance, the directness, the dependency, the similarity, the influence degree of the relay node, and the robustness will be used. Further, an overall relationship, such as, e.g., an average distance between the node and a plurality of reference point nodes, may be evaluated.

Concretely, the reference point node selection unit 102 selects a plurality of reference point nodes. Further, in each node, the relationship evaluation unit 104 evaluates at least one of the distance, directness, dependency, similarity, influence degree of the relay node with respect to each reference point node, and the robustness will be evaluated.

Figure 16:
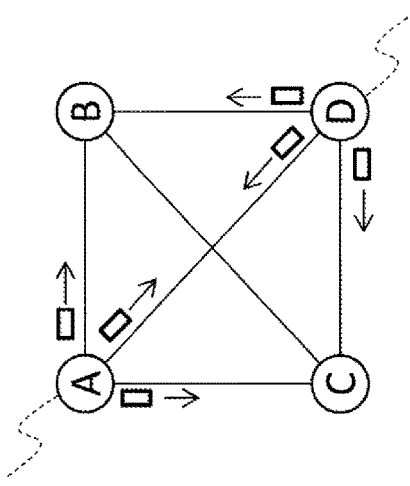
FIG. 16 is a diagram showing a virtual communication network according to Example 9.

For example, as shown in FIG. 16, in the virtual communication network in which nodes A, B, C, and D are mutually connected via links (the propagation success rate of each of all the links is 0.5), it is assumed that the communication packets each having a divided volume of 400 are propagated from the node A to its adjacent nodes B, C, and D by multiplying the volume by the propagation success rate, further propagated sequentially to its adjacent nodes by multiplying the volume by the propagation success rate, and the lifetime is completed when the number of hops is 2. At this time, the node B receives the communication packet having a volume of 200 via the path A→B, the communication packet having a volume of 50 via the path A→C→B, and the communication packet having a volume of 50 via the path D→B. Further, from the node D, the communication packet having a volume of 200 via the path D→B, the communication packet having a volume of 50 via the path D→C→B, and the communication packet having a volume of 50 via the path D→A→B are propagated.

Thus, it can be evaluated such that the average distance of the relationship of the node B with respect to the reference point node A and D is (300+300)/2=300.

Thus, in the original relationship graph, the average distance of the relationship of the node B with respect to the referenced point nodes A and D can be evaluated, which enables to evaluate the relationship of, e.g., the distance by considering a plurality of contexts (existence or nonexistence, where, with whom, what).

In this Example, it is evaluated by the distance (average distance) of the node with respect to each reference point node. However, it may be evaluated from the distance, directness, dependency, similarity, or influence degree of the relay node with respect to each reference point node, or the robustness.

Example 10

Extraction of Characteristic Node

In this Example, a communication packet is propagated from nodes located within a certain range from a reference point node as propagate origins, and it is evaluated by extracting characteristic node, or a partial network from a node distribution within a certain range.

Concretely, the virtual communication network simulation unit 202 propagates sequentially a communication packet from a plurality nodes within a predetermined range from the reference point node as propagation origins to their adjacent nodes. Further, the relationship evaluation unit 104 evaluates by extracting characteristic nodes or partial network based on the communication packet distribution received at nodes within the predetermined range.

Figure 17:
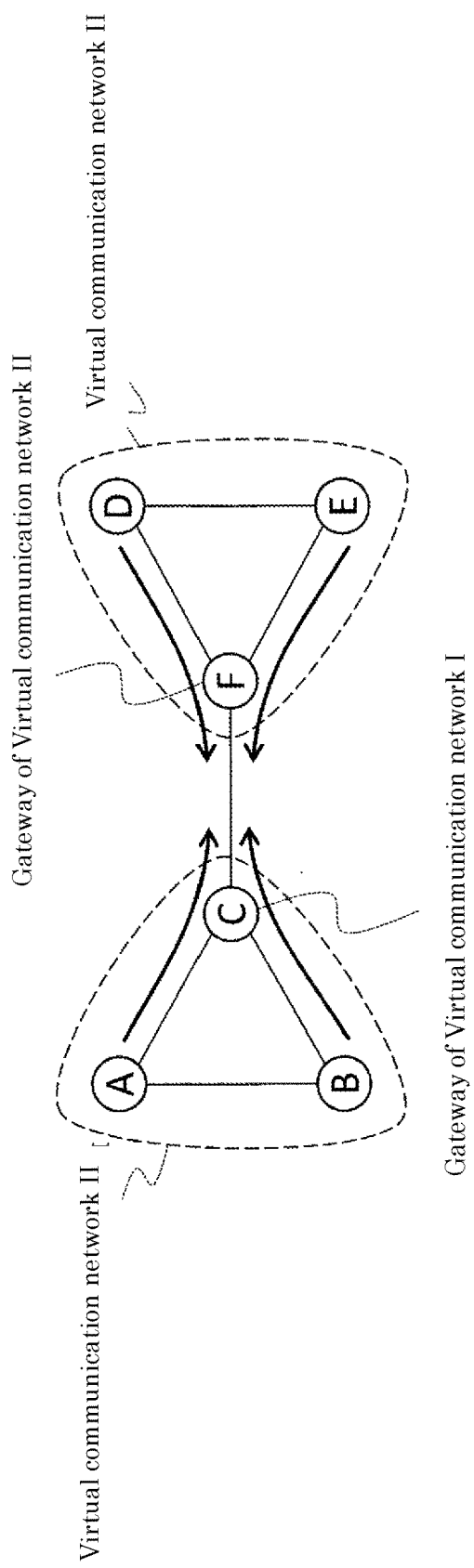
FIG. 17 is a diagram showing a virtual communication network according to Example 10.

For example, as shown in FIG. 17, a virtual communication network I in which nodes A, B, and C are mutually connected via links, and a virtual communication network II in which nodes D, E, and F are mutually connected via links are provided, and the virtual communication network I and the virtual communication network II are mutually connected via a link between the nodes C and F. In such virtual communication networks I and II, a communication packet which is sufficiently large in lifetime is sequentially propagated to adjacent nodes from nodes within the range of the network as propagation origins.

Thus, the analysis of the path information reveals that the communication packet which goes into and out the virtual communication network I always passes the node C, and the communication packet which goes into and out the virtual communication network II always passes the node F, which enables to evaluate that the nodes C and F are representative node, respectively.

Therefore, in the original relationship graph, it can be evaluated such that the nodes C and F are representative nodes, respectively. For this reason, since it can be said that the subgraphs corresponding to the relationship graphs I and II are representing a certain group, it becomes possible to deem the representative nodes C and F as gateways of the subgraphs I and II, respectively.

In this Example, it is evaluated by extracting characteristic nodes from the node distribution. However, it can be evaluated by extracting characteristic partial network.

Some embodiments of the present invention were described with reference to drawings above. However, the present invention is not limited to the embodiments as illustrated. With respect to the illustrated embodiments, it is possible to add various amendments or modifications within the same range or within the equivalent range of the present invention.

DESCRIPTION OF REFERENCE SYMBOLS

1 present system
10 relationship evaluation module
    100 relationship graph database
    101 selection information input unit
    102 reference point node selection unit
    103 relationship graph extraction unit
    104 relationship evaluation unit
    105 relationship evaluation result output unit
20 virtual communication network simulator
    200 virtual communication network database
    201 virtual communication network creation unit
    202 virtual communication network simulation unit
30 terminal device
40 server

The invention claimed is:

1. A relationship graph evaluation system configured to evaluate a relationship graph in which a plurality of nodes is connected with links, comprising:
    a relationship graph database configured to store the relationship graph;
    a selection information input unit to which selection information regarding a reference point node is input;
    a reference point node selection unit configured to select the reference point node based on the selection information regarding the reference point node input by the selection information input unit;
    a relationship graph extraction unit configured to extract the relationship graph including the plurality of nodes and links connecting the nodes, which becomes an evaluation target from the relationship graph database based on the reference point node selected by the reference point node selection unit, wherein a length of a link between two connected nodes is directly related to a strength of the relationship between the two connected nodes;
    a relationship evaluation instruction unit of a relationship evaluation unit configured to specify a control parameter and to transmit the relationship graph;
    a virtual communication network creation unit configured to create a virtual communication network based on the relationship graph extracted by the relationship graph extraction unit and the control parameter, wherein the virtual communication network includes a plurality of virtual communication nodes connected with virtual links, each virtual link having values for a propagation success rate and a propagation delay determined by the length of the corresponding link in the relationship graph;
    a virtual communication network simulation unit configured to execute simulation based on the control parameter by sequentially propagating a virtual communication packet to its adjacent node from the reference point node selected by the reference point node selection unit as a propagate origin in a virtual communication network created by the virtual communication network creation unit;
    the relationship evaluation unit configured to evaluate a relationship of the node with respect to the reference point node based on a content of the communication packet received by the node as a result of executing the simulation by the virtual communication network simulation unit; and
    a relationship evaluation result output unit configured to output an evaluation result of the relationship of the node with respect to the reference point node by the relationship evaluation unit.

2. The relationship graph evaluation system as recited in claim 1, wherein the virtual communication network simulation unit records information of received communication packet and then propagates the communication packet to an adjacent node.

3. The relationship graph evaluation system as recited in claim 1, wherein the virtual communication network simulation unit does not make each node propagate the communication packet to a node from which the communication packet was propagated.

4. The relationship graph evaluation system as recited in claim 1, wherein, when the virtual communication network simulation unit propagates the communication packet to an adjacent node in each node, the virtual communication network simulation unit propagates by multiplying a propagation success rate of a link with an adjacent node by a volume of the communication packet.

5. The relationship graph evaluation system as recited in claim 1, wherein, when the virtual communication network simulation unit propagates the communication packet to an adjacent node in each node, the virtual communication network simulation unit increases the number of hops of the communication packet by one or more, and discards the communication packet when the number of hops has reached a predetermined number of hops.

6. The relationship graph evaluation system as recited in claim 1, wherein, when the virtual communication network simulation unit propagates the communication packet to an adjacent node in each node, the virtual communication network simulation unit increases a cumulative delay of the communication packet by the propagation delay of link, and discards the communication packet when the communication packet has reached a predetermined cumulative delay.

7. The relationship graph evaluation system as recited in claim 1, wherein the virtual communication network simulation unit propagates the communication packet to a node having the highest link in propagation success rate among adjacent plural nodes.

8. The relationship graph evaluation system as recited in claim 1, wherein the virtual communication network simulation unit duplicates a communication packet having the same volume in accordance with the number of adjacent nodes in each node, and propagates the duplicated communication packets to adjacent plural nodes, respectively.

9. The relationship graph evaluation system as recited in claim 1, wherein the virtual communication network simulation unit divides the volume of the communication packet depending on the number of adjacent nodes, and propagates the divided communication packets to a plurality of respective nodes.

10. The relationship graph evaluation system as recited in claim 9, wherein the virtual communication network simulation unit divides the volume of the communication packet in proportion to the propagation success rate of the link between adjacent nodes.

11. The relationship graph evaluation system as recited in claim 1, wherein the relationship evaluation unit evaluates a distance from a reference point node to each node based on a sum of a volume of each of communication packets propagated from the reference point node via different paths.

12. The relationship graph evaluation system as recited in claim 1, wherein the relationship evaluation unit evaluates a similarity of each node by comparing a similarity of the number, volume, or path of the communication packets received at each node.

13. The relationship graph evaluation system as recited in claim 1, wherein the relationship evaluation unit evaluates a directness of the node with respect to the reference point node based on the minimum number of hops among the number of hops of each communication packet propagated from the reference point node via different paths.

14. The relationship graph evaluation system as recited in claim 1, wherein the relationship evaluation unit evaluates a dependency of the node with respect to the reference point node based on the number and volume of communication packets propagated from the reference point node via different paths.

15. The relationship graph evaluation system as recited in claim 1, wherein, when each of a plurality of communication packets propagated from the reference point node via difference paths is received via a common relay node in each node, the relationship evaluation unit evaluates such that the relay node is larger in influence degree with respect to the relationship between the reference point node and the node.

16. The relationship graph evaluation system as recited in claim 1, wherein the relationship evaluation unit evaluates, in each node, a robustness of the node based on the number of communication packets propagated from the reference point node via different paths.

17. The relationship graph evaluation system as recited in claim 1, wherein the relationship evaluation unit evaluates a relationship of the node with respect to the reference point node based on a content of the communication packet received at the node in a process that the communication packet is propagated by the virtual communication network simulation unit every predetermined number of hops or every predetermined time.

18. The relationship graph evaluation system as recited in claim 1, wherein the reference point node selection unit selects a plurality of reference point nodes, and the relationship evaluation unit evaluates, in each node, at least one of distance, directness, dependency, similarity with respect to each reference point node, an influence degree of a relay node, or robustness.

19. The relationship graph evaluation system as recited in claim 1, wherein the virtual communication network simulation unit sequentially propagates the communication packet to adjacent nodes from a plurality of nodes within a predetermined range from the reference point node as propagation origins, and the relationship evaluation unit extracts characteristic nodes or a partial networks based on a distribution of communication packets received at nodes within the predetermined range and evaluates them.

* * * * *